United States Patent Office 3,681,224
Patented Aug. 1, 1972

3,681,224
ELECTROPHORETIC COATING METHOD
Sanford E. Stromberg, Tonawanda, N.Y., assignor to Textron, Inc.
No Drawing. Filed May 8, 1970, Ser. No. 35,913
Int. Cl. B01k 5/02; C23b 13/00
U.S. Cl. 204—181      17 Claims

ABSTRACT OF THE DISCLOSURE

A method for electrophoretically coating a solid substrate which comprises forming a coating on said substrate comprising a carbonyloxy-group containing film-forming, polymeric material and a melamine crosslinking agent by electrodeposition from an aqueous dispersion (including both solution and suspensions) using an acid treatment, preferably a post-deposition treatment, to effect reduced curing schedules. The disclosed method allows curing schedules at reduced curing conditions of time and temperature.

---

This invention relates to an improved process for coating electrically-conductive substrates with film-forming materials followed by curing under reduced conditions of time and/or temperature. More particularly, this invention relates to the electrodeposition from a bath of at least partially neutralized, water-dispersible, carbonyloxy-containing-film-forming resins and suitable melamine crosslinking agent on conductive substrates using acid treatment, preferably a post deposition treatment, to effect curing with reduced time and/or temperature requirements.

There are available in the art many descriptions of methods for coating electrically conductive objects by electrophoresis or electrodeposition, as well as many compositions which are suitable for use in such procedures. In the usual electrodeposition system, the article to be coated is placed in an aqueous bath and the article itself is either electrically-conductive or bears an electrically-conductive, exposed coating. Such articles are sometimes hereinafter referred to as electrically-conductive substrates. The aqueous bath contains a water-dispersible, film-forming coating component which is often an organic resin bearing carbonyloxy groups. In the system the article to be coated forms the anode in a direct current circuit with the vessel holding the aqueous bath or another conductor in the bath serving as the cathode. Direct current from an outside source is applied through the bath via the electrodes and the film-forming material becomes coated on the anode with the thickness of the resulting film being dependent on various factors such as the composition of the film-forming material, the applied voltage and the system geometry. In any event, as coating proceeds, the resistance of the article or anode to current flow increases until a relatively uniform coating covers essentially the entire article. Completion of the coating process is generally indicated when the current becomes substantially constant. By this procedure it is convenient and economical to obtain uniform coating of all portions of the article even when it has an intricate surface configuration. The deposited coating may then be cured, generally either by oxidative baking or baking with a curing agent, to form a hard, resistant coating. The prior art procedures do not allow curing of the deposited films at the reduced conditions of time and/or temperature provided according to this invention.

In the present invention, a carbonyloxy-containing, film-forming polymeric material containing suitable melamine crosslinking agent is treated with an acid, advantageously an aqueous acid solution, either by addition of the acid to an electrodeposition bath, by contacting a coating of the polymeric material and crosslinking agent deposited from an electrodeposition bath with the acid or by a combination of such acid treatments. Advantageously, the acid treating is accomplished by spraying, rinsing or dipping the substrate bearing the deposited coating with or in an aqueous acid solution. The acid-contacting treatment allows the utilization of reduced time and/or temperature requirements for curing.

The electrodeposition process of this invention allows greatly increased flexibility of curing schedules with attendant savings in curing costs. For example, a range of baking schedules using temperatures of about 200° F. for about 30 minutes to temperatures of about 350° F. for about 5 minutes or substantially less is now possible. Additionally the use of reduced curing temperatures allows various substrates which are deformable at temperatures above about 210° F., such as vacuum metalized plastics, to be cured after deposition of the carbonyloxy-containing, polymeric film-forming material without normally attendant substrate distortion. Furthermore, the use of low curing temperatures according to this invention substantially eliminates undesirable film discoloration normally present after high temperature curing.

The film-forming materials employed in the coatings applied by this invention are water dispersible, i.e. water thinnable or water-soluble or can be made so, and are those materials often characterized as electrodepositable, film-forming, carbonyloxy-containing, polymeric materials Thus, the film-forming materials form current-carrying anions in the bath and deposit on the anode in a form in which they are relatively water- and electrically-resistant materials. The film-forming material may act as a binder for pigment in the coating and normally the film-forming material is a carbonyloxy-containing organic resin. Many of these film-forming materials are known in the art and are often composed to a major extent of a synthetic resin made from one or more carboxylic acids or their anhydrides or esters. Among the useful resins are those having an electrical equivalent weight between about 1000 and 20,000 and an acid number or acid value of about 20 to 300, preferably an acid number of about 30 to 150. Electrical equivalent weight is described in U.S. Pat. No. 3,230,162, herein incorporated by reference.

The film-forming resins which can be used in this invention include those formed by the reaction of carbonyloxy group

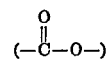

containing monomers, with other monomers. Frequently, the latter monomers have up to about 30, preferably up to about 12, carbon atoms, while the carbonyloxy group-containing monomers often have up to about 20 carbon atoms but may contain considerably more. For instance, polyesters formed from unsaturated fatty acids and polyols, with or without drying and semi-drying oils are useful. Although the carbonyloxy group-containing monomer can be unsaturated and monocarbonyloxy, e.g. acrylic acids and esters and lower alkyl-substituted acrylic acids and esters, it is preferred that it be composed to a major extent of polycarbonyloxy materials, i.e. having two or more

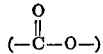

groups, often having 4 to about 12 carbon atoms such as trimellitic acid, adipic acid, maleic anhydride, itaconic acid, phthalic anhydride, itaconic anhydride, fumaric acid, etc. and their lower alkyl esters. If the carbonyloxy containing monomer is an ethylenically-unsaturated monomer, the other monomer, usually present in a minor amount, say up to about 25 or more weight percent, may include many ethylenically-unsaturated materials, especially vinyl members such as styrene, acrylonitrile, butadiene, vinyl toluene, butylenes, octenes and similar monomers. The drying oils and semidrying oils which may be present in alkyd resins, for instance, are represented by, for instance, linseed oil, oiticica oil, safflower oil, perilla oil, tung oil, soybean oil and other suitable oils including bodied oils. The polyol component in these oils is generally glycerol since the oils for the most part are available as glycerides, Other useful polyols such as ethylene glycol, neopentyl glycol, pentaerythritol and trimethylopropane can be employed in modifying the oils or in forming polyesters, and these polyols often have up to about 12 carbon atoms. The polyol component can also be a polyester polyol.

Various types of the above broadly described carbonyloxy-containing, film-forming resins have previously been disclosed as being useful in electrodeposition processes. For example, the various carbonyloxy-containing, film-forming resins described in U.S. Pats. Nos. 3,098,834; 3,230,162; 3,362,899; 3,366,563; 3,369,983; 3,404,079 and 3,449,228, herein incorporated by reference, are useful in this invention. It is thus clear that the essential requirement of this invention is that the material to be coated be film-forming, water-dispersible and carbonyloxy-containing.

Normally, the carbonyloxy-containing materials used in this invention are at least partially neutralized with a water-soluble amino compound such as ammonia and organic amines. Such a procedure increases the water-dispersibility of the carbonyloxy-containing coating materials; in some cases such neutralization is required to effect water-dispersibility of the coating material. Advantageously, the carbonyloxy-containing coating materials are neutralized less than 100%, preferably from about 70 to 80% to form an electrodeposition bath having a pH of about 6.5 to 7.0, with an organic amine. Useful organic amines are at least partially water soluble at room temperature and include hydroxy amines, polyamines and monoamines such as: monoethanolamine, diethanolamine, triethanolamine, N-methyl ethanolamine, N-aminoethylethanolamine, N-methyl diethanolamine, monoisopropanolamine, diisopropanolamine, triisopropanolamine, "poly glycol amines" such as $HO(C_2H_4O)_2C_3H_6NH_2$, hydroxylamine, butanolamine, hexanolamine, methyldiethanolamine, octanolamine, and alkylene oxide reaction products of mono- and polyamines such as the reaction product of ethylene diamine with ethylene oxide or propylene oxide, laurylamine with ethylene oxide, etc.; ethylene diamine, diethylene triamine, triethylene tetramine, hexamethylene tetramine, tetraethylene pentamine, propylene diamine, 1,3-diaminopropane, imino-bis-propyl amine, and the like; and mono-, di- and tri-lower alkyl ($C_{1-8}$) amines such as mono-, di- and tri-ethyl amine.

Also, the carbonyloxy-containing coating materials of this invention are coated from an aqueous electrodeposition bath containing a melamine crosslinking agent capable of crosslinking the coating material through the carbonyloxy group present therein. The preferred type of melamine crosslinking agents are melamine-aldehyde, i.e. formaldehyde, reaction products wherein at least some of the methylol groups have been modified with hydroxyl-containing substances, advantageously alcohols. Specifically, hexakis (hydrocarbyloxy methyl) melamine wherein the hydrocarbyl groups have about 1 to 12 carbon atoms, such as lower alkyl of from 1 to 8 carbon atoms, derivatives, and derivative-containing mixtures of such melamines, are advantageous. Exemplary of these resins are hexakis (methoxymethyl) melamine; hexakis (alkoxymethyl) melamines in which the alkyl groups are mixtures of methyl and ethyl groups, e.g. at least about 25 mole percent of each, based on their total; and hexakis (alkoxymethyl) melamines in which two alkoxymethyl groups have 3 to 5 carbon atoms. Further exemplary of suitable melamine crosslinking agents are those of the types previously mentioned described, for instance, in U.S. Pats. 3,403,088; 3,444,114; 3,449,228; and 3,471,388, herein incorporated by reference. The melamine crosslinking agents are normally present in the electrodeposition bath in minor, crosslinking amounts, such as about 15 to 40%, preferably about 20 to 35%, by weight based on the carbonyloxy-containing coating material present. Preferably, melamine-formaldehyde crosslinking agents are present in amounts of about 25 to 35% by weight to provide ample available crosslinking sites.

The acids useful to treat the electrodeposited coating according to this invention are water-soluble acids. Normally, these acids are those having an ionization constant in an aqueous solution at room temperature greater than about $1 \times 10^{-6}$, and may be either organic or inorganic in character. Exemplary members of this class of acids are aromatic sulfonic acids such as benzene sulfonic acid and toluene sulfonic acid, inorganic mineral acids such as sulfuric, nitric, hydrochloric, or phosphoric acids, and other organic acids such as formic acid, acetic acid, oxalic acid, sulfamic acids, chloroacetic acid, trichloroacetic acid, malonic acid and maleic acid.

The suitable acids for the acid treatment can be used in aqueous solutions and the amount of acid (non-aqueous basis) used is about 0.5 to 25 weight percent, preferably 1 to 15 weight percent, based on the total resin and crosslinking agent deposited on the substrate. Normally, the acid contacting treatment is carried out by spraying, rinsing or dipping the substrate carrying the deposited coating with the acid solution for a short period of time. Advantageously, the coated substrate is removed from the electrodeposition bath and rinsed with a water-soluble, non-ionic surfactant, especially those having polyoxyethylene groups such as polyoxyethylene alkyl phenyl ethers, and water spray to remove any non-deposited free or excess coating material and alleviate surface imperfections caused by "water spotting." Then the coated substrate is contacted over its complete coated surface with the aqueous acid solution as by spraying, rinsing or dipping. After a relatively short time, normally on the order of from a few seconds to several minutes or more, the coated substrate can again be contacted with a water-soluble, non-ionic surfactant again especially those having polyoxyethylene groups such as the polyoxyethylene alkyl phenyl ethers and water to avoid film discoloration resulting from the presence of residual acid during baking.

Additionally, acid treatment with the acids referred to previously may be accomplished in the electro-deposition bath itself. Normally, if present in the bath the acid is added in minor, effective amounts, say from about 0.1 to 10% and preferably less than about 5% by weight, of the total bath solids. A portion of the acid in the bath will be carried with the water-dispersible resin and electrodeposited within and on the coating at the anode or due to the anionic nature thereof will migrate to the anode itself under the influence of the electric current. The presence of some acid within the electrodeposited coating will also enhance the curing requirements regarding time and temperature.

In the electrodeposition of the coatings contacted with acids according to this invention, conditions known in the art are suitable. Thus, the voltage is above the threshold deposition voltage of the film-forming material and generally does not exceed values just below the rupture voltage of the coating. Frequently, the voltages are of the order of about 20 or 500 volts, preferably about 40 to 200 volts. Temperatures of the aqueous bath maintained during electrodeposition are generally about 60 to 125° F. or more, preferably about 70 to 95° F. The film-forming materials and the pigments or other materials, which remain in the cured film, are often a minor proportion, for instance, about 2 to 35 weight percent, preferably about 5 to 15 weight percent, based on the total weight of the aqueous bath. Thus, the water can be about 65 to 98 weight percent of the aqueous bath, preferably about 85 to 95 weight percent. Of course, the bath contains the anode and cathode in the usual spaced-apart relationship and the bath can be agitated to maintain uniform temperatures and dispersion of the coating components. Normally films of about 0.2 to 1.5 mils, preferably about 0.4 to 0.7 mil, are formed from electrodeposition from such baths. These films generally have excellent hardness.

As previously noted, the coating compositions employed in the method of this invention can contain other materials such as solid pigments, dyes, paint-type driers, surfactants to aid in dispersing the film-forming, pigment components, non-ionic organic liquids and other desirable ingredients. In pigmented coatings the amount of film-forming material to pigment weight ratio is often about 0.25 to 20:1, preferably about 1 to 5:1. Among the desired pigmented coating materials, those containing conductive pigments such as carbon black and black iron oxide, the latter being particularly advantageous, are especially useful since plural coatings may be deposited using such conductive pigments. Also, enameled paint-like coatings can be formed using normal pigments such as titanium dioxide.

The following examples describe non-limitative, preferred embodiments of this invention. It is noted that these examples indicate that the coatings treated according to this invention are curable at temperatures from about 200 to 250° F., normally 200° to 230° F., in less than about 30 minutes. Curing can be conducted at higher temperatures, say up to about 400 or 450° F., which permit the use of shorter times but may have disadvantageous effects on the coating. Unless stated otherwise, in the examples the parts are by weight.

EXAMPLE I

The following illustrates the electrodeposition of an oil modified alkyd resin without any acid treatment. A resin formulated with tall oil fatty acids, phthalic anhydride, pentaerythritol, and ethylene glycol and cooked at 390° F. to Acid No. of 40 is then conventionally reduced with n-butoxy ethanol and methyl ethyl ketone couplers. A 10% pigment volume concentration (PVC is the volume of pigment/volume of pigment plus resin solids) black primer was formulated with this vehicle as follows:

3800 parts above vehicle
1594 parts black iron oxide (approx. 3:1 weight ratio of black iron oxide, $Fe_2O_3$, to FeO)
713 parts Resimene 740 (an alcohol-modified melamine-formaldehyde crosslinking agent available commercially from Monsanto; 25% on resin solids)
185 parts triethyl amine The primer is reduced to 10% total non-volatile, with deionized water, to be used as an electrocoating (EDP) bath. Films are deposited on Bonderite 37 and clean steel substrates at 50, 75, and 100 volts for 60 seconds, and cured for 30 minutes at 245° F. The resultant film properties were good exhibiting an excellent cure at the above temperature schedule.

| Substrate | EDP conditions | Cure | Hardness |
|---|---|---|---|
| Bonderite 37 | 50 volts/60 sec | 245° F./30 minutes | 3H |
| Do | 75 volts/60 sec | do | 3H |
| Do | 100 volts/60 sec | do | 3H |
| Clean steel | 50 volts/60 sec | do | 2H |
| Do | 75 volts/60 sec | do | 2H |
| Do | 100 volts/60 sec | do | 2H |

EXAMPLE II

The following illustrates the acid treatment of oil-modified alkyd resin of Example I including conductive pigment, during both the deposition and post-deposition stages.

A resin formulated with tall oil fatty acids, phthalic anhydride, pentaerythritol, and ethylene glycol and cooked at 390° F. to Acid No. of 40 is then conventionally reduced with n-butoxy ethanol and methyl ethyl ketone couplers. A 10% pigment volume concentration black primer is formulated with this vehicle as follows:

3800 parts above vehicle
1594 parts black iron oxide (approx. 3:1 weight ratio of black iron oxide, $Fe_2O_3$, to FeO)
713 parts Resimene 740 (an alcohol-modified melamine-formaldehyde cross-linking agent available commercially from Monsanto; 25% on resin solids)
185 parts triethyl amine The primer is then reduced to 10% total non-volatile with deionized water to be used as an electrocoating (EDP) bath.

A 5% solution of p-toluene sulfonic acid (p-TSA) in deionized water is added, at 4% on total bath solids, to the electrodeposition bath of black primer illustrated above. Films are deposited on Bonderite 37, clean steel and aluminum substrates at 50 volts for 60 seconds. The following procedure is then followed in the rinsing stage, prior to curing:

(a) The film is first rinsed with a 0.5% Igepal CO–630, a commercially available polyoxyethylene nonyl phenyl ether surfactant/deionized water spray.
(b) Rinsing with a 15% p-TSA/deionized water spray is carried out.
(c) Finally, a 0.5% Igepal CO–630 surfactant/deionized water rinse is repeated.

Films were cured at schedules of 230° F. for 30 minutes and 212° F. for 30 minutes with very good results as presented below:

| Substrate | EDP conditions | Cure | Hardness |
|---|---|---|---|
| Bonderite 37 | 50 volts/60 sec | 230° F./30 minutes | 2–3H |
| Clean steel | do | do | 2–3H |
| Aluminum | do | do | 2–3H |
| Bonderite 37 | do | 212° F./30 minutes | 2H |
| Clean steel | do | do | 2H |
| Aluminum | do | do | 2H |

A comparison of the curing schedules of Examples I and II indicate that with the acid treatment of this invention the required curing temperature is reduced more than about 15° F., the time of cure being the same in each case.

EXAMPLE III

The following illustrates the acid treatment of an alcohol-modified polyester during both the deposition and post deposition stages.

A resin based on trimellitic anhydride, neopentyl glycol, and adipic acid is cooked at 370° F. to an acid number of 55-60 and then conventionally reduced with methyl ethyl ketone, butoxy diethylene glycol. 25% on resin solids of Cymel XM 1116 and triisopropanol amine sufficient to provide the 75% neutralization level. Cymel XM 1116 is an alcohol modified melamine-formaldehyde crosslinking agent, i.e. a hexakis (alkoxymethyl) melamine in which the alkyl groups are a mixture of methyl and ethyl groups as in U.S. Pat. No. 3,471,388. The vehicle is then further reduced to 10% total non-volatile with deionized water for use as an electrodeposition bath. In addition, a 5% solution of p-toluene sulfonic acid catalyst in deionized water equivalent to 4% on total bath solids added to the bath. Clear films are then electrodeposited on clean steel, Bonderite 37, and brass substrates at 50 volts for 30 seconds. The 3 steps rinsing process, as described in Example II, is also used here, with subsequent cure of the films at 215° F. for 30 minutes. The results, on brass and Bonderite 37 are excellent, while those on clean steel are very good. Films are tough and hard, exhibiting good cure.

30 minutes gave excellent results in that the cured films were tough and hard as noted below:

| Substrate | EDP conditions | Cure | Hardness | Film thickness, mil. |
|---|---|---|---|---|
| Clean steel | 50 volts/60 sec | 221° F/30 minutes | 2H | 0.5 |
| Bonderite 37 | do | do | 3H | 0.5 |
| Brass | do | do | 3H | 0.2 |
| Aluminum | do | do | 3H | 0.4 |

EXAMPLE V

The following illustrates the treatment of an alcohol modified polyester additionally containing a nonconductive pigment during both the deposition and post-deposition stages:

Using the resin described in Example III, a 10% PVC white enamel is prepared as follows:

6875 parts resin solids in coupler solvents (by weight)
1320 parts Cymel XM 1116 (25% on resin solids)
2750 parts titanium dioxide
800 parts triisopropanol amine (80% neutralization level)

The enamel is then reduced to 10% total non-volatile with deionized water for use as an electrodeposition bath. A 5% solution of p-toluene sulfonic acid in deionized water is also added in an amount equivalent to 4% on bath solids. White films are deposited on clean steel, Bonderite 37, and aluminum substrates at 50 volts for 60 seconds. Rinsing of the films is conducted in the same three-step manner illustrated in the previous examples. When cured

| Substrate | EDP conditions | Cure | Hardness | Film thickness, mil. |
|---|---|---|---|---|
| Clean steel | 50 volts/30 sec | 215° F/30 minutes | 2H | 0.6 |
| Bonderite 37 | do | do | 3H | 0.5 |
| Brass | do | do | 3H | 0.3 |

EXAMPLE IV

The following illustrates the acid treatment of an alcohol-modified polyester only during the post-deposition stage.

An electrodeposition bath containing the same resin illustrated in Example III is prepared with the following modifications:

(a) Cymel XM 1116 cross-linker is present at 32% based on resin solids.
(b) No p-toluene sulfonic acid catalyst is introduced to the EDP bath.

Clear films are deposited on clean steel, Bonderite 37, brass, and aluminum substrates at 50 volts for 60 seconds and rinsed in the same manner as described in Examples I and II, i.e. surfactant/water, p-toluene sulfonic acid/water, surfactant/water. A cure schedule of 221° F. for at 230° F. for 30 minutes, the resultant films are tough and hard as indicated below:

| Substrate | EDP conditions | Cure | Hardness | Film thickness, mil |
|---|---|---|---|---|
| Clean steel | 50 volts/60 sec | 230° F./30 minutes | 2H | 0.6 |
| Bonderite 37 | do | do | 3H | 0.6 |
| Aluminum | do | do | 3H | 0.6 |

EXAMPLE VI

The following illustrates the treatment of an alcohol-modified polyester with acid treatment during both the deposition and post-deposition stages. The acid treatment herein is accomplished by dipping rather than rinsing with an acid spray.

An electrodeposition bath similar to the one illustrated in Example III is prepared. The only modification relates to the Cymel XM 1116 crosslinker which is present herein at 30% on resin solids. Clear films are electrodeposited on Bonderite 37 substrates, rinsed with surfactant/water spray, dipped into a 5% p-toluene sulfonic acid deionized water solution, and cured at about 212° F. for 30 minutes (in some cases a second surfactant/water rinse is used after the acid dip). Films are tough and hard as noted below:

| Substrate | EDP conditions | Cure | Hardness | Film thickness, mil | Surfactant/H₂O rinses |
|---|---|---|---|---|---|
| Bonderite 37 | 50 volts/30 sec | 212° F./30 minutes | 3H | 0.4 | 1 |
| Do | do | do | 3H | 0.4 | 2 |

EXAMPLE VII

This illustrates the treatment of an alcohol-modified polyester using various strong acids for the acid treatment during the deposition and post-deposition stages as in Example IV.

An electrodeposition bath identical to that illustrated in Example VI is prepared. Clear films are deposited on Bonderite 37, Clean Steel, and Aluminum substrates and rinsed in the same manner as described in Examples II, III and IV using catalyst solutions other than p-toluene sulfonic acid. Also the three stages of surfactant/water, acid/water, surfactant/water treatment are used. A cure schedule of about 212° F. for 30 minutes gave excellent results in that the cured films were tough and hard as noted in the table below:

are then rinsed in the same manner as previously described (surfactant/water, p-toluene sulfonic acid/water, surfactant/water). When cured at 203° F. for 30 minutes, the films were very good, and the polypropylene articles exhibited no distortion. The shape retention was excellent. EDP conditions include 40 volts for 30 seconds and a p-toluene sulfonic acid deionized water solution.

In addition to the above Examples II through IX utilizing low curing temperatures, this invention also enables curing of electrodeposited films for shorter times than those previously illustrated. Generally, the prior art indicates that 15–20 minutes at 350° F. and 30 minutes at 300° F. are the most frequently used cure schedules for EDP films. Using the post-acid rinse, however, schedules of 4 to 5 minutes at 350° F. and 10 minutes at 300° F.

| Substrate | EDP conditions | Acid catalyst | Solution concentration (by weight), percent | Cure |
|---|---|---|---|---|
| Bonderite 37 | 50 volts/30 sec | Sulfuric | 5 | 215° F./30 minutes. |
| Clean steel | do | do | 5 | Do. |
| Aluminum | do | do | 5 | Do. |
| Bonderite 37 | do | do | 10 | Do. |
| Bonderite 37 | do | Phosphoric | 5 | Do. |
| Clean steel | do | do | 5 | Do. |
| Aluminum | do | do | 5 | Do. |
| Bonderite 37 | do | do | 10 | Do. |
| Bonderite 37 | do | Acetic | 5 | Do. |
| Clean steel | do | do | 5 | Do. |
| Aluminum | do | do | 5 | Do. |
| Bonderite 37 | do | do | 10 | Do. |
| Bonderite 37 | do | Oxalic | 5 | Do. |
| Clean steel | do | do | 5 | Do. |
| Aluminum | do | do | 5 | Do. |
| Bonderite 37 | do | do | 10 | Do. |
| Bonderite 37 | do | Sulfamic | 5 | Do. |
| Clean steel | do | do | 5 | Do. |
| Aluminum | do | do | 5 | Do. |
| Bonderite 37 | do | do | 10 | Do. |
| Bonderite 37 | do | Formic | 5 | Do. |
| Clean steel | do | do | 5 | Do. |
| Aluminum | do | do | 5 | Do. |
| Bonderite 37 | do | do | 10 | Do. |
| Bonderite 37 | do | Trichloroacetic | 5 | Do. |
| Clean steel | do | do | 5 | Do. |
| Aluminum | do | do | 5 | Do. |
| Bonderite 37 | do | do | 10 | Do. |

EXAMPLE VIII

The following illustrates the use of lower concentration acid solutions in the post-treatment:

Using the same electrodeposition bath illustrated in Example VII, clear films are deposited on Bonderite 37 substrates, and rinsed in the same manner previously described using 1, 2, and 3% solutions of p-toluene sulfonic acid as the acid rinse post treatment. At these concentrations, tough and hard cured films are still obtained at a baking schedule of about 212° F. for 30 minutes as noted below:

can be effected. This is a distinct advantage as it offers economy to the end user by decreasing the time necessary in the curing oven. The following two examples indicate the affect of acid post-treatment on the required curing time.

EXAMPLE X

This example illustrates the use of shorter curing times with a post acid treated alcohol modified polyester.

An electrodeposition bath is prepared from the "polyester prepolymer" resin illustrated in Example III, Cymel

| EDP conditions | Acid rinse concentration, percent | Cure | Hardness |
|---|---|---|---|
| Bonderite 37 50 volts/30 sec | 3 | 212° F./30 minutes | 3H |
| Do do | 2 | do | 3H |
| Do do | 1 | do | 3H |

EXAMPLE IX

The following illustrates another pigmented bath treated according to this invention on a vacuum metalized deformable substrate.

A blue aqueous pigment dispersion of Du Pont's Monastral Blue B is added in an amount equivalent to 5% on resin solids to the electrodeposition bath illustrated in Example VI. Blue films are deposited on vacuum metalized (chrome plated) polypropylene substrates. The films XM 116 cross-linker, at 30% on resin solids, triisopropanol amine equivalent to the 75% neutralization level, and enough deionized water to give a 10% non-volatile solution. Clear films are then electrodeposited on Bonderite 37 substrates. EDP conditions in all cases include 50 volts for 60 seconds. The three-step rinsing process shown in Example II (water/surfactant, p-toluene sulfonic acid/water, water/surfactant) is used after deposition, utilizing a 10% p-toluene sulfonic acid/deionized water solution as the acid rinse. The cured clear films were all approximately 0.5 mil thick and exhibited the following hardnesses:

| Cure temp., °F. | Cure time, minutes | Film hardness |
|---|---|---|
| 375 | 4 | 6H |
| 350 | 5 | 6H |
| 335 | 7 | 5H |
| 300 | 10 | 5H |
| 275 | 15 | 5H |
| 250 | 20 | 4H |
| 230 | 30 | 3H |
| 220 | 30 | 3H |
| 212 | 30 | 2-3H |
| Controls (without acid treatment) | | |
| 375 | 10 | 6H |
| 350 | 15 | 6H |
| 300 | 30 | 5H |
| 250 | 30 | 2H |

EXAMPLE XI

The following illustrates the shorter curing times with a post-acid treated oil modified alkyd additionally having a conductive pigment.

An electrodeposition bath identical to the one illustrated in Example II, i.e. 10% PVC black primer based on an oil modified alkyd resin at 10% total non-volatiles (TNV), is prepared. Films are deposited on Bonderite 37 substrates, at 50 volts for 60 seconds. Before curing, the films are subjected to the three-step rinsing treatment using a 10% p-toluene sulfonic acid/deionized water solution as the acid catalyst rinse. Film thicknesses were 0.4 to 0.5 mil.

| Cure temp., °F. | Cure time, minutes | Film hardness |
|---|---|---|
| 375 | 5 | 6H |
| 350 | 5 | 6H |
| 325 | 7 | 6H |
| 300 | 10 | 6H |
| 257 | 15 | 5H |
| 250 | 20 | 5H |
| 230 | 30 | 3H |
| 220 | 30 | 3H |
| 212 | 30 | 2-3H |
| 205 | 40 | 2-3H |
| Controls (without acid treatment) | | |
| 350 | 15 | 6H |
| 300 | 30 | 6H |

It should also be noted that at the above shorter time curing schedules, the black primer films are still conductive for use in two-coat EDP systems.

EXAMPLE XII

This example illustrates the low temperature cured film properties when no post-acid rinse treatment incorporated after films have been electrodeposited. The catalyst (p-toluene sulfonic acid) is included in the bath only. The cure is poorer than when the rinse treatment is applied. In addition, the speed of cure at higher temperatures is also reduced when no acid rinse is used. Thus, the post-deposition treatment of this invention provides more desirable final coatings.

An electrodeposition bath identical to that illustrated in Example II was prepared at 10% total non-volatile content. Clear films were electrodeposited on clean steel and Bonderite 37 substrates. After deposition, no post acid rinse was used and films were baked at 220° F. for 30 minutes. The films were tacky and partially uncured (less than H hardness) as compared with 2H to 3H hardness when the acid rinse treatment was used. At higher temperatures, the following results were found:

| Cure temp., °F. | Cure time, minutes | Hardness | Acid rinse |
|---|---|---|---|
| 375 | 10 | 6H | No. |
| 350 | 15 | 6H | No. |
| 375 | 4 | 6H | Yes. |
| 350 | 5 | 6H | Yes. |
| 335 | 7 | 5H | Yes. |

What is claimed is:

1. A method for electrophoretically coating a solid substrate anode which comprises forming on said substrate a coating comprising a carbonyloxy-group containing, film-forming, polymeric material and a melamine crosslinking agent capable of effecting cross-linking between the carbonyloxy groups of the polymeric material, by direct current electrodeposition from an aqueous dispersion, and contacting said coating prior to curing with a water-soluble acid having an ionization constant of greater than about $1 \times 10^{-6}$ to reduce the severity of the required curing conditions, and curing said coating.

2. A method of claim 1 wherein the acid treatment is conducted after deposition of the coating by separating the coated substrate from said aqueous dispersion and contacting the coated substrate with an aqueous solution of the acid.

3. A method of claim 2 wherein a small, effective amount of said acid is additionally present in the electrodeposition bath.

4. The method of claim 2 wherein the separated coated substrate is washed with water before and after contact with said acid.

5. A method of claim 2 wherein the cross-linking agent is an alcohol-modified melamine-formaldehyde reaction product.

6. A method of claim 5 wherein the alcohol-modified melamine-formaldehyde condensation product is a hexakis (alkoxymethyl) melamine in which the alkoxy groups are lower alkoxy of 1 to about 8 carbon atoms or mixtures thereof.

7. A method of claim 6 wherein the alcohol-modified melamine-formaldehyde condensation product is a hexakis (alkoxymethyl) melamine in which the alkyl groups are ethyl and methyl and there being at least about 25 mole percent of each of ethyl and methyl based on their total.

8. A method of claim 7 wherein the separated coated substrate is washed with water before and after contact with said acid.

9. A method of claim 8 wherein the wash water contains a water-soluble, non-ionic surfactant.

10. A method of claim 1 wherein the aqueous dispersion additionally contains sufficient organic amine to at least partially neutralize the carbonyloxy-containing, film-forming, polymeric material.

11. A method of claim 2 wherein the aqueous dispersion additionally contains sufficient organic amine to at least partially neutralize the carbonyloxy-containing, film-forming, polymeric material.

12. A method of claim 11 wherein the acid-treated coating is cured by heating.

13. A method of claim 1 wherein the acid is selected from the group consisting of toluene sulfonic acid, inorganic mineral acid, acetic acid, oxalic acid, sulfamic acid, formic acid and trichloroacetic acid.

14. A method of claim 12 wherein the acid is selected from the group consisting of toluene sulfonic acid, inorganic mineral acid, acetic acid, oxalic acid, sulfamic acid, formic acid and trichloroacetic acid.

15. A method of claim 14 wherein the dispersion additionally contains a conductive pigment.

16. The method of claim 2 wherein the acid is selected from the group consisting of toluene sulfonic acid, inorganic mineral acid, acetic acid, oxalic acid, sulfamic acid, formic acid and trichloroacetic acid.

17. A method of claim 16 wherein the acid treated coating is cured by heating.

References Cited

UNITED STATES PATENTS

| 3,175,964 | 3/1965 | Watanabe et al. | 204—181 |
| 3,471,388 | 10/1969 | Koral | 204—181 |
| 3,565,781 | 2/1971 | Jerabek | 204—184 |

HOWARD S. WILLIAMS, Primary Examiner